United States Patent
Nakao et al.

(10) Patent No.: US 10,977,510 B2
(45) Date of Patent: Apr. 13, 2021

(54) INFORMATION-PROCESSING DEVICE AND INFORMATION-PROCESSING METHOD

(71) Applicant: NTT DOCOMO, INC., Tokyo (JP)

(72) Inventors: Naoyuki Nakao, Tokyo (JP); Kaisei Nagao, Tokyo (JP); Syouta Hamamatsu, Tokyo (JP); Yoshikatsu Kanemaru, Tokyo (JP); Masahiko Sakurai, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 6 days.

(21) Appl. No.: 16/477,577

(22) PCT Filed: Dec. 5, 2017

(86) PCT No.: PCT/JP2017/043700
§ 371 (c)(1),
(2) Date: Jul. 12, 2019

(87) PCT Pub. No.: WO2018/142756
PCT Pub. Date: Aug. 9, 2018

(65) Prior Publication Data
US 2019/0370593 A1    Dec. 5, 2019

(30) Foreign Application Priority Data

Jan. 31, 2017 (JP) ............................. JP2017-015128

(51) Int. Cl.
*G06K 9/32* (2006.01)
*G06T 7/70* (2017.01)
(Continued)

(52) U.S. Cl.
CPC ....... *G06K 9/3241* (2013.01); *G06K 9/00664* (2013.01); *G06T 5/50* (2013.01); *G06T 7/70* (2017.01)

(58) Field of Classification Search
None
See application file for complete search history.

(56) References Cited

FOREIGN PATENT DOCUMENTS

| EP | 3068128 A1 | * | 9/2016 | ........... G06F 16/434 |
| EP | 3068128 A1 | | 9/2016 | |

(Continued)

OTHER PUBLICATIONS

European Search Report issued in corresponding PCT Application No. PCT/JP2017/043700, dated Nov. 27, 2019, 7 pages.
(Continued)

*Primary Examiner* — Delomia L Gilliard
(74) *Attorney, Agent, or Firm* — MKG, LLC (57) ABSTRACT

An information-processing device, when image recognition performed by an object recognition function and a first category recognition function on a captured image acquired from an image capture display device fails, and image recognition performed by a second category recognition function succeeds, informs a user of a method for capturing an image that enables object recognition, and causes the object recognition function to perform image recognition on another captured image that is captured in accordance with the method. If the image recognition performed by the object recognition unit on the other captured image succeeds, information-processing device instructs image capture display device to display a composite image determined according to a result of the image recognition at a position determined according to the result of the image recognition.

8 Claims, 6 Drawing Sheets

(51) Int. Cl.
*G06K 9/00* (2006.01)
*G06T 5/50* (2006.01)

(56) References Cited

FOREIGN PATENT DOCUMENTS

JP 2015-046071 A 3/2015
JP 2015090593 A 5/2015

OTHER PUBLICATIONS

Office Communication issued in corresponding Japanese Patent Application No. 2018-565967, dated Apr. 28, 2020, 12 pages.
International Search Report issued in corresponding PCT Application No. PCT/JP2017/043700, dated Jan. 1, 2018, 4 pages.
First Notification of Office Action issued in corresponding Chinese Patent Application No. 201780083269.2, dated Sep. 3, 2020.
First Notification of Office Action issued in corresponding Chinese Patent Application No. 21780083269.2, dated Sep. 3, 2020.

\* cited by examiner

| RECOGNITION TYPE | IMAGE RECOGNITION RESULT | | FIRST COMPOSITE IMAGE ID | DISPLAY POSITION OF FIRST COMPOSITE IMAGE |
|---|---|---|---|---|
| | CATEGORY | PROPER NOUN | | |
| CATEGORY CLASSIFICATION | BRIDGE | – | C001 | ABSOLUTE COORDINATES X1,Y1 |
| | BUILDING | – | C002 | ABSOLUTE COORDINATES X2,Y2 |
| | ... | ... | ... | ... |
| OBJECT DETECTION | BUILDING | CLOCK TOWER | C020 | RELATIVE COORDINATES x1,y1 |
| | CAR | – | C021 | RELATIVE COORDINATES x2,y2 |
| | CARD | COMPANY A POINT CARD | C022 | RELATIVE COORDINATES x3,y3 |
| | | | C023 | RELATIVE COORDINATES x4,y4 |
| | ... | ... | ... | ... |

INFORMATION-PROCESSING DEVICE AND INFORMATION-PROCESSING METHOD

TECHNICAL FIELD

The present invention relates to an image recognition technique.

BACKGROUND ART

Japanese Patent Application No. JP 2015-46071 A1 discloses a device including a first recognition unit that performs image recognition on a target image by use of learning images, and a second recognition unit that performs image recognition on the target image with a higher accuracy than that of the first recognition unit when image recognition by the first recognition unit fails. If image recognition by the second recognition unit succeeds, the device registers target-image information to prepare a learning image.

In the field of image recognition for real-world scene images, two types of recognition techniques are used: category classification and object detection. Category classification, which is also referred to as general object recognition, enables identification of a category or a proper noun of an object shown in an image; however, use of the category classification technique does not enable identification of a position of an object in the image. Object detection, which is also referred to as specific object recognition, enables identification of a category or a proper noun of an object shown in an image, and also identification of a position in the image of the object and an outline of the object.

It is known that object detection is more difficult to perform than category classification. Reasons why object detection is more difficult are that there are a large number of categories for objects, an object may vary in position or attitude, a lighting condition may vary, a scale may vary, and there may be deformation of the object.

The present invention has been made in view of the above-described circumstances, and an object thereof is to improve a probability of object detection in image recognition.

SUMMARY OF THE INVENTION

The present invention provides an information-processing device comprising: an object recognition unit configured to recognize a position of an object shown in a captured image; a category recognition unit configured to recognize a category to which an object shown in the captured image belongs; and a recognition control unit configured, when recognition by the object recognition unit fails and recognition by the category recognition unit succeeds, to inform a user of a method for capturing an image, and to cause the object recognition unit to recognize another object shown in another captured image that is captured in accordance with the method.

The category recognition unit may include: a first category recognition unit configured to recognize a category to which an object shown in the captured image belongs; and a second category recognition unit configured to a category to which an object shown in the captured image belongs, the category being different from the category that can be recognized by the first category recognition unit, and the recognition control unit may be configured, when recognition by the object recognition unit and recognition by the first category recognition unit fail and recognition by the second category recognition unit succeeds, to inform the user of the method for capturing an image, and to cause the object recognition unit to recognize another object shown in another captured image that is captured in accordance with the method.

The recognition control unit may be configured to inform the user of the method for capturing an image, by instructing an image capture display device configured to capture another image in accordance with the user's operation to display the other captured image, to display another image indicating a position in the captured image of the object, in the captured image.

The recognition control unit may be configured to inform the user of the method for capturing an image, by instructing the image capture display device to display another image representing the object on the captured image.

The information-processing device may further comprise an image composition instruction unit configured, when a position of an object is recognized by the object recognition unit, to instruct an image capture display device configured to capture another image in accordance with the user's operation to display the other captured image, to combine a composite image determined according to the recognized object with the captured image based on the recognized position in the captured image of the object, and when a category is recognized by the category recognition unit, to instruct the image capture display device to superimpose another composite image determined according to the recognized category with the captured image.

The present invention also provides an information-processing method comprising: recognizing a position of an object shown in a captured image; recognizing a category to which an object shown in the captured image belongs; and when the position of the object is not recognized and the category to which the object belongs is recognized, informing a user of a method for capturing an image, and recognizing another object shown in another captured image that is captured in accordance with the method.

The present invention makes it possible to improve a probability of object detection in image recognition.

DETAILED DESCRIPTION

An embodiment of the present invention will be described below with reference to the drawings.

Configuration

Figure 1:
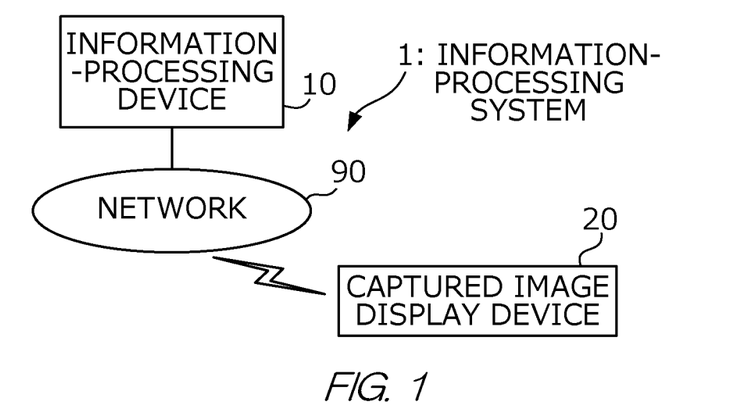
FIG. 1 is a diagram showing an example of a configuration of an information-processing system according to an embodiment of the present invention.

FIG. 1 is a diagram showing an example of a configuration of information-processing system 1 according to an embodiment of the present invention. Information-processing system 1 includes: information-processing device 10 that recognizes an image; image capture display device 20 that captures and displays an image; and network 90 that connects information-processing device 10 with image capture display device 20 such that they can communicate with each other. Network 90 is, for example, a local area network (LAN), a wide area network (WAN) or a combination thereof. Network 90 may include a wired section or a wireless section. FIG. 1 shows a single information-processing device 10 and a single image capture display device 20; however, information-processing system 1 may include plural information-processing devices 10 and plural image capture display devices 20.

Figure 8:
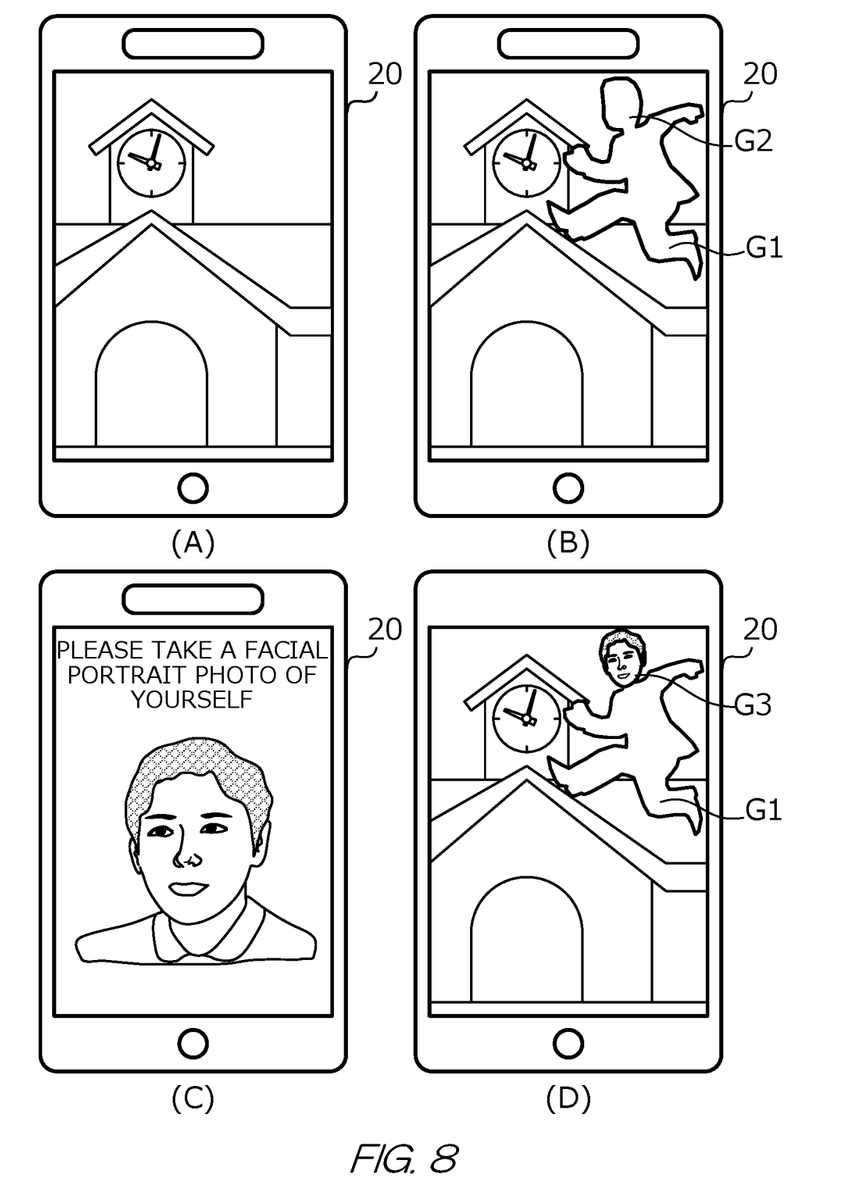
FIG. 8 is a diagram showing an example of display performed by the image capture display device.

An outline description of the information-processing system 1 shown in FIG. 1 follows. Information-processing device 10 acquires a captured image from image capture display device 20, and performs image recognition on the captured image. Subsequently, information-processing device 10 instructs image capture display device 20 to combine the captured image with a composite image (referred to as a first composite image) that is determined based on a result of the image recognition, and to further combine the captured image with a composite image (referred to as a second composite image) different from the first composite image, such that the second composite image is arranged at a predetermined position relative to the first composite image. As a result of the instruction, for example, in a case where an image of a landscape shown in FIG. 8(A) is captured by image capture display device 20, the image may be combined with a character animation of a man running as first composite image G1 determined according to the landscape, as shown in FIG. 8(B). First composite image G1 includes blank area G2 that is arranged at a predetermined position corresponding to the head of the man shown in first composite image G1. Subsequently, when a user takes his/her facial image by use of image capture display device 20, as shown in FIG. 8(C), the facial image is superimposed on area G2 of first composite image G1 as second composite image G3, as shown in FIG. 8(D). As a result, the landscape image displayed on image capture display device 20 is combined with a character animation of a man running who has the face of the user. The user can thus enjoy viewing the composite image having personalized features unique to the user.

The image recognition function of information-processing device 10 includes an object recognition function and a category recognition function. The category recognition function includes two types of functions: a first category recognition function and a second category recognition function. The object recognition function, which is also referred to as object detection or specific object recognition in the field of image recognition for a real-world scene image, enables identification of a category or a proper noun of an object shown in an image, and also identification of a position in the image of the object and an outline of the object. To this end, the object recognition function, for example, extracts local features from an image and applies statistical learning to the extracted local features. In the present embodiment, the object recognition function is used to recognize an object and a position in an image of the object, and to display a composite image determined according to the recognized object at a position determined according to the recognized position.

The category recognition function, which is also referred to as general object recognition in the field of image recognition for a real-world scene image, enables identification of a category or a proper noun (hereafter simply referred to as "identification of a category") of an object shown in an image; however such recognition does not enable identification of a position in the image of the object. To enable identification of a category or a proper noun, the category recognition function, for example, extracts features from an image to calculate a vector quantization histogram and matches the calculated histogram against histograms prepared for each category. In the present embodiment, the first category recognition function is used to recognize a category of an object shown in an image, and to display a composite image determined according to the recognized category. The first category recognition function recognizes a category of an object that belongs to a predetermined first category group. The second category recognition function shares an algorithm for recognizing a category of an object shown in an image, with the first category recognition function; however, the second category recognition function recognizes a category of an object that belongs to a predetermined second category group that is different from the first category group. The first category recognition function and the second category recognition function cover different category groups.

The first category group is a set of objects for which a category is to be recognized. Objects to be classified into the first category group may be selected freely. In the present embodiment, the first category group is a set of objects such as a vehicle or a person. The second category group is a set of objects for recognition after category recognition. Objects to be classified into the second category group may be selected freely. In the present embodiment, the second category group is a set of objects such as a point card issued by a company to a consumer, or a company logo.

Information-processing device 10, when image recognition performed by the object recognition function on a captured image acquired from image capture display device 20 succeeds, instructs image capture display device 20 to display a composite image determined according to a result of the image recognition at a position determined according to the result of the image recognition. Information-processing device 10, when image recognition performed by the object recognition function on a captured image acquired from image capture display device 20 fails, and image recognition performed by the first category recognition function on the captured image succeeds, instructs image capture display device 20 to display a composite image determined according to a result of the image recognition. Information-processing device 10, when image recognition performed by the object recognition function and the first category recognition function on a captured image acquired from image capture display device 20 fails, and image recognition performed by the second category recognition function on the captured image succeeds, informs a user of a method for capturing an image that enables object recognition, acquires an image that has been captured in accordance with the image capture method, and causes the object recognition function to recognize an object from the acquired captured image. As a result, when image recognition performed by the object recognition function on the captured image succeeds, information-processing device 10 instructs image capture display device 20 to display a composite image determined according to a result of the image recognition at a position determined according to the result of the image recognition.

One reason why categories of objects are divided into the first category group covered by the first category recognition function and the second category group covered by the second category recognition function is that the two category groups differ for purposes of image recognition. The first category group requires recognition of a category, whereas the second category group requires recognition of an object. An object belonging to the second category group is required to be recognized by the object recognition function; however, the object may not be correctly recognized due to, for example, variation in a position or attitude of the object, or deformation of the object. In such a case, by informing a user of a method for capturing an image that enables the user to adjust a position, attitude, or shape of the object, recognition of the object can be accomplished. At least some of the objects covered by the second category recognition function overlap with those covered by the object recognition function.

Another reason why categories of objects are divided into the two category groups is that if the first category group and the second category group are integrated into a single category group, category recognition becomes less accurate.

Figure 2:
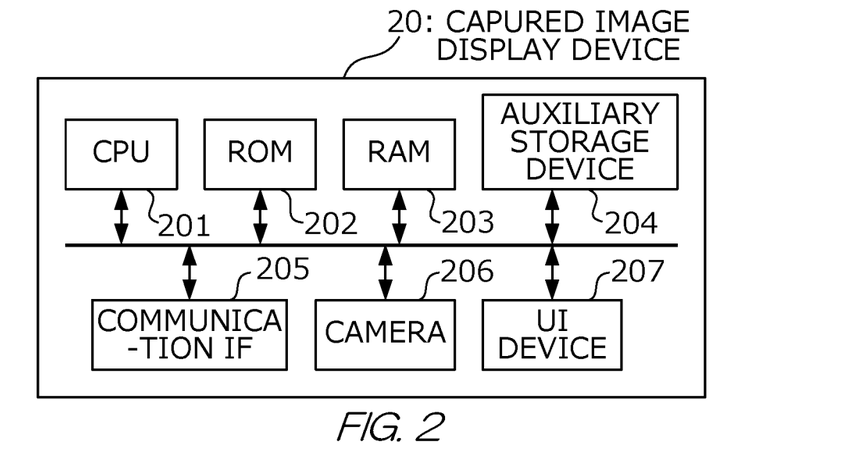
FIG. 2 is a block diagram showing an example of a hardware configuration of an image capture display device.

Now, a configuration of information-processing system 1 will be described in detail. FIG. 2 is a diagram showing a hardware configuration of image capture display device 20. Image capture display device 20 is a device that captures an image in accordance with a user's operation to display the captured image. Image capture display device 20 is, for example, a computer capable of communication such as a smartphone, a tablet, or a wearable terminal. Image capture display device 20 includes central processing unit (CPU) 201, read only memory (ROM) 202, random access memory (RAM) 203, auxiliary storage device 204, communication IF 205, camera 206, and UI device 207. CPU 201 is a processor that performs processing operations. ROM 202 is a non-volatile memory that stores a program and data to be used to boot image capture display device 20. RAM 203 is a volatile memory that serves as a work area where CPU 201 executes a program. Auxiliary storage device 204 is a non-volatile storage device such as a hard disk drive (HDD) or a solid state drive (SSD). Auxiliary storage device 204 stores a program and data to be used in image capture display device 20. When the program stored in auxiliary storage device 204 is executed by CPU 201, image capture display device 20 functions as a computer device that provides functions (described later) shown in FIG. 5. Communication IF 205 is an interface for enabling communication via network 90 in accordance with a predetermined communication standard. The predetermined communication standard may be either wired or wireless communication. In a case where communication IF 205 conforms to wireless communication, communication IF 205 may include an antenna and a communication circuit that conform to a communication standard such as Long Term Evolution (LTE) or Wi-Fi (registered trademark). Cameras 206 include a lens and an optical element for generation of data that is representative of a captured image. Cameras 206 include an in-camera provided on the front side of image capture display device 20 and an out-camera provided on the rear side of image capture display device 20. The in-camera is mainly used to capture a user's image, and the out-camera is mainly used to capture a landscape image. UI device 207 includes an operation unit that includes, for example, keys or a touch sensor, a display unit that includes, for example, a liquid crystal panel and a liquid crystal drive circuit, and an audio output unit that includes, for example, a speaker or an earphone jack. It is of note that image capture display device 20 may further include other components such as a global positioning system (GPS) unit, a gyro sensor, and an acceleration sensor.

Figure 3:
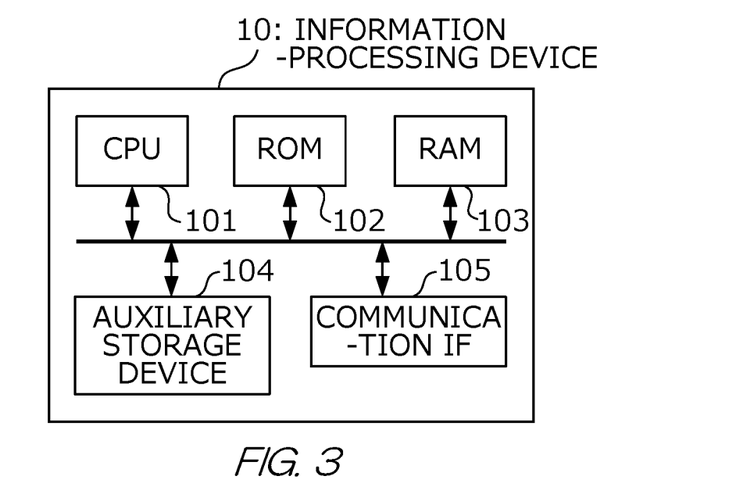
FIG. 3 is a block diagram showing an example of a hardware configuration of an information-processing device.

FIG. 3 is a diagram showing a hardware configuration of information-processing device 10. Information-processing device 10 is a computer device that includes CPU 101, ROM 102, RAM 103, auxiliary storage device 104, and communication IF 105. CPU 01 is a processor that performs operations. ROM 102 is a non-volatile memory that stores a program and data to be used to boot information-processing device 10. RAM 103 is a volatile memory that serves as a work area where CPU 101 executes a program. Auxiliary storage device 104 is a non-volatile storage device such as an HDD or an SSD. Auxiliary storage device 104 stores a program and data to be used in information-processing device 10. When the program stored in auxiliary storage device 104 is executed by CPU 101, information-processing device 10 functions as a computer device that provides functions (described later) shown in FIG. 5. Communication IF 105 is an interface for enabling communication via network 90 in accordance with a predetermined communication standard. It is of note that information-processing device 10 may further include other components such as a UI device.

Auxiliary storage device 104 stores an image recognition algorithm used for image recognition, a first composite image data set used to enable image capture display device 20 to display a first composite image, and a composite image determination table used to determine a first composite image to be displayed in image capture display device 20.

Figure 4:
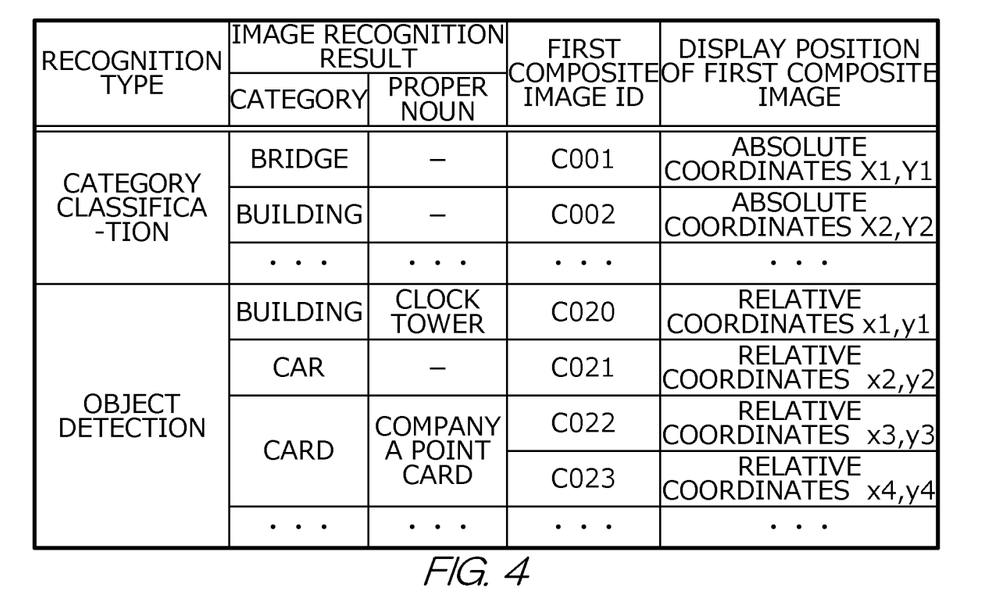
FIG. 4 is a diagram showing an example of a composite image determination table stored in the information-processing device.

FIG. 4 is a diagram showing an example of the composite image determination table. In the composite image determination table, a type of image recognition function, a result of image recognition, a first composite image ID used to identify a first composite image, and a display position of a first composite image are associated with each other. In FIG. 4, it is defined that if a category "bridge" is recognized for an object shown in an image by information-processing device 10, a first composite image identified by first composite image ID "C001" determined according to the recognized category is displayed at absolute coordinates X1 and Y1 in the image. The absolute coordinates refer to coordinates of an X-Y coordinate system that is pre-defined in a display area of image capture display device 20. Thus, the first composite image is superimposed at a position (for example, the center of the display area) indicated by the absolute coordinates in the display area of image capture display device 20, regardless of a position of the object "bridge" in the image.

It is also defined that if a category "building," a proper noun "clock tower," and a position are recognized for an object shown in an image by information-processing device 10, a first composite image identified by first composite image ID "C020" determined according to the recognized object (the category or proper noun) is displayed at relative coordinates x1 and y1 in the image. The relative coordinates refer to coordinates of an X-Y coordinate system that is defined with reference to the recognized object "clock tower." The X-Y coordinate system, for example, includes the center of gravity of the object as the origin, and includes a scale unit determined according to a size of the object. In the case of this example, since the first composite image is superimposed at a position indicated by the relative coordinates, relative to the position of the object "clock tower" in the image, a display position of the first composite image depends on the position of the object "clock tower." For example, first composite image G1 is always displayed above a roof of the object "clock tower" in the direction of gravity, as shown in FIG. 8(B).

It is of note that data on each first composite image stored in auxiliary storage device 104 includes data indicative of a display position of a second composite image relative to a first composite image. For example, first composite image data representing first composite image G1 that is a character animation of a man running, as shown in FIG. 8(B), includes data indicative of area G2 in first composite image G1, which corresponds to the head of the man.

Figure 5:
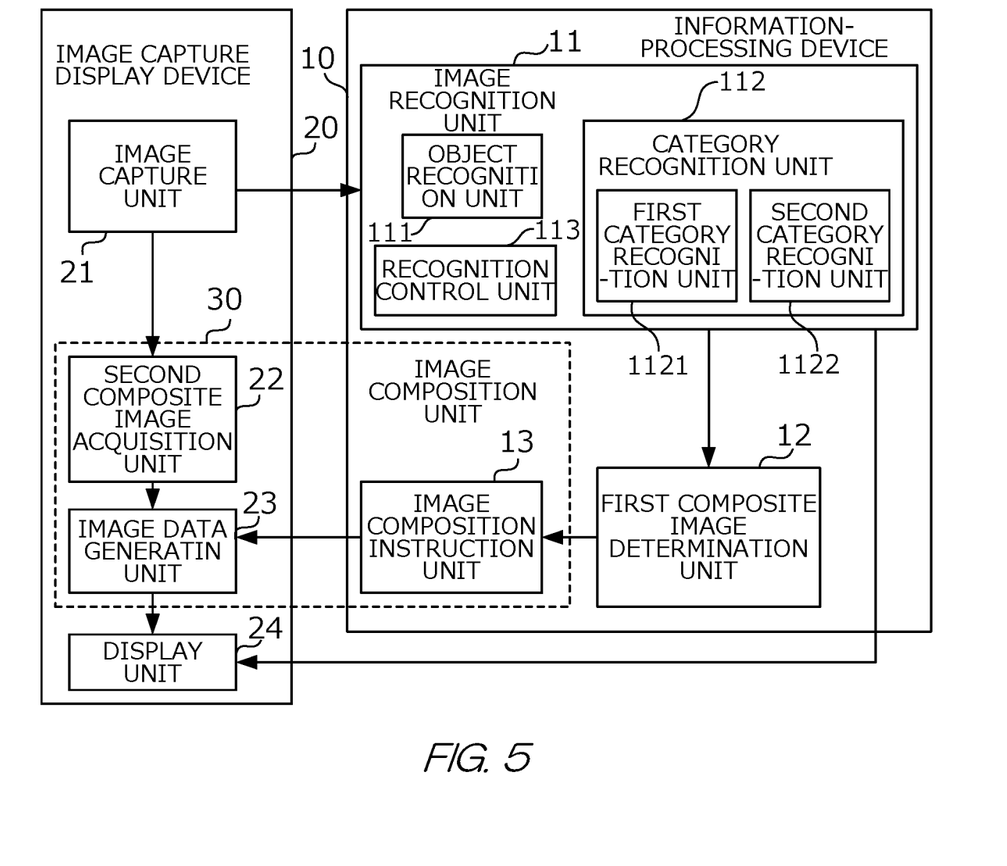
FIG. 5 is a block diagram showing an example of a functional configuration of an information-processing system.

FIG. 5 is a block diagram showing a functional configuration of information-processing system 1. As shown in FIG. 5, image capture display device 20 includes image capture unit 21 that captures an image, second composite image acquisition unit 22 that acquires a second composite image, image data generation unit 23 that combines an image captured by image capture unit 21 with a first composite image and a second composite image to generate image data, and display unit 24 that displays an image determined according to image data generated by image data generation unit 23.

Information-processing device 10 includes image recognition unit 11 that performs image recognition on an image captured by image capture unit 21, a first composite image determination unit 12 that determines a first composite image depending on a result of image recognition performed by image recognition unit 11, and image composition instruction unit 13 that instructs image capture display device 20 to superimpose a first composite image determined by first composite image determination unit 12 on an image captured by image capture unit 21, and to superimpose a second composite image at a predetermined position on the image, relative to the superimposed first composite image.

Image recognition unit 11 includes object recognition unit 111, category recognition unit 112 including first category recognition unit 1121 and second category recognition unit 1122, and recognition control unit 113. Object recognition unit 111 provides the object recognition function, first category recognition unit 1121 provides the first category recognition function, and second category recognition unit 1122 provides the second category recognition function.

Recognition control unit 113, when image recognition performed by object recognition unit 111 and first category recognition unit 1121 fail, and image recognition performed by second category recognition unit 1122 has succeeds, informs a user of a method for capturing an image, acquires an image that has been captured in accordance with the method, and causes object recognition unit 111 to perform image recognition on the acquired image. To inform a user of a method for capturing an image, recognition control unit 113 instructs image capture display device 20 to display in a captured image, an image indicative of a position of the object whose category was recognized. More specifically, recognition control unit 113 instructs image capture display device 20 to superimpose on a captured image an image representative of the object whose category was recognized.

Image composition instruction unit 13, when image recognition performed by object recognition unit 111 succeeds, instructs image capture display device 20 to combine a composite image determined according to a recognized object with a captured image based on a position of the recognized object. Also, image composition instruction unit 13, when image recognition performed by object recognition unit 111 fails, and instead image recognition performed by first category recognition unit 1121 succeeds, instructs image capture display device 20 to combine a composite image determined according to a recognized category with a captured image.

Image capture unit 21 and second composite image acquisition unit 22 are provided by camera 206 of image capture display device 20, image data generation unit 23 provided by CPU 201 of image capture display device 20, and display unit 24 is provided by UI device 207 of image capture display device 20. Image recognition unit 11 is provided by CPU 101 of information-processing device 10, first composite image determination unit 12 is provided by a combination of CPU 101 and auxiliary storage device 104 of information-processing device 10, and image combination instruction unit 13 is provided by a combination of CPU 101 and communication IF 105 of information-processing device 10. Image data generation unit 23 and image composition instruction unit 13 form image composition unit 30 that is included in information-processing system 1. Image combining unit 30 combines an image captured by image capture unit 21 with a first composite image that depends on a result of image recognition performed by image recognition unit 11.

Operation

Figure 6:
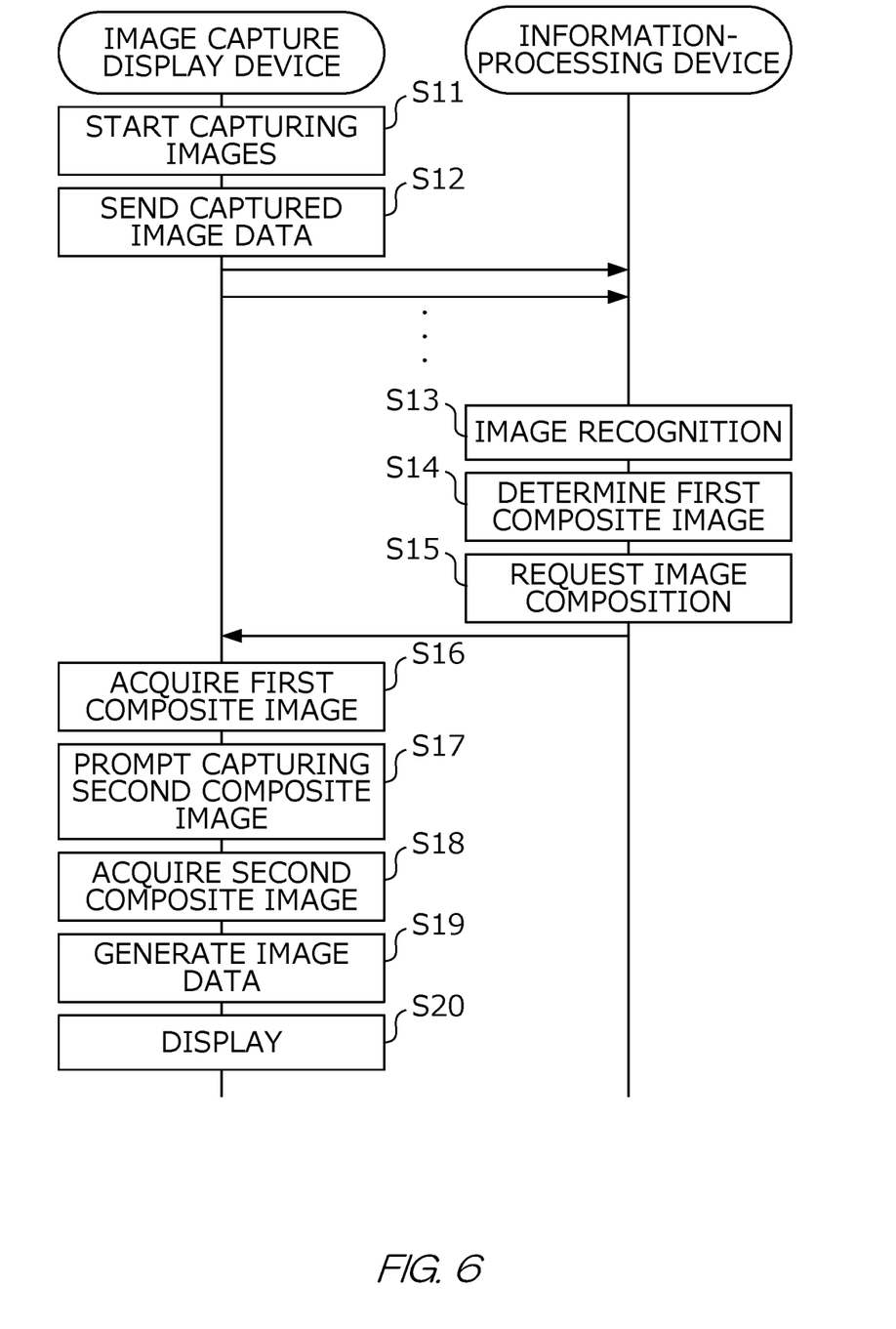
FIG. 6 is a flowchart showing an example of an operation procedure of the information-processing system.

An example of display control of information-processing system 1 will be described with reference to FIGS. 6 to 9. As shown in FIG. 6, a user initially activates image capture unit 21 (the out-camera) of image capture display device 20 to start capturing an image of a target object (step S11). An image captured by image capture unit 21 is displayed in real time in the display area of image capture display device 20, which image changes depending on an image capture direction of image capture unit 21. For example, if the user aims image capture display device 20 at a landscape including a clock tower, and performs a predetermined operation, a captured image as shown in FIG. 8(A) is displayed in the display area of image capture display device 20. Data on the captured image is sent from communication IF 205 to information-processing device 10 (step S12). Transmission of the captured image data may start responsive to the user's operation, or may start automatically without waiting for the user's operation. This transmission of the captured image data may be performed continuously following the start of transmission, or may be periodically performed following the start of transmission. It is desirable for image capture display device 20 to compress the captured image data.

Image recognition unit 11 of information-processing device 10 performs image recognition on the captured image data (step S13). This image recognition process will be described in detail later with reference to FIG. 7.

When the image recognition is successful, first composite image determination unit 12 determines a first composite image to be combined with the captured image in image capture display device 20, based on a result of the image recognition (step S14). As a result of the image recognition, when a category of an object is recognized by first category recognition unit 1121, first composite image determination unit 12 identifies first composite image ID corresponding to the recognized category in the table shown in FIG. 4, and retrieves first composite image data identified by the first composite image ID from auxiliary storage device 104. Image composition instruction unit 13 sends an image composition instruction to image capture display device 20, which instruction includes the retrieved first composite image data and data on absolute coordinates corresponding to the recognized category in the table shown in FIG. 4 (step S15). The first composite image data includes data indicative of a display position of a second composite image relative to the first composite image, as described above.

As a result of the above image recognition, when an object is recognized by object recognition unit 111, first composite image determination unit 12 identifies first composite image ID corresponding to the recognized object in the table shown in FIG. 4, and retrieves first composite image data identified by the first composite image ID from auxiliary storage device 104. Image composition instruction unit 13 sends an image composition instruction to image capture display device 20, which instruction includes the retrieved first composite image data, data on coordinates of the object in the display area of image capture display device 20, and data on relative coordinates corresponding to the recognized object in the table shown in FIG. 4 (step S15). The first composite image data includes data indicative of a display position of a second composite image relative to the first composite image, as described above.

Image data generation unit 23 of image capture display device 20, upon acquiring the image composition instruction (step S16), displays the first composite image at a position indicated by the absolute or relative coordinates, over the captured image displayed on display unit 24. For example, in a case where the user takes a photo of a landscape including a clock tower, as shown in FIG. 8(B), image data generation unit 23 displays first composite image G1 that is an animation image of a man running, above a roof of the clock tower, as shown in FIG. 8(B).

Subsequently, image data generation unit 23 prompts the user to capture a second composite image (step S17), for example, by displaying a message "please take a facial portrait photo of yourself" and by specifying a position for capturing a facial image in the display area of image capture display device 20.

Upon being prompted, the user takes a photo of his/her face by use of image capture unit 21 (the in-camera); as a result, an image of the user's upper body including his/her face is displayed in the display area of image capture display device 20, as shown in FIG. 8(C). Image data generation unit 23 extracts a partial image showing only the user's face from the displayed image, as a second composite image (step S18). Subsequently, image data generation unit 23 combines the captured image with the first composite image and the second composite image to generate image data (step S19), and displays an image determined according to the generated image data (step S20). For example, image data generation unit 23 displays first composite image G1 showing a man running, at a head position of which second composite image G3 showing the user's face is arranged, above a roof of the clock tower, as shown in FIG. 8(D).

Figure 7:
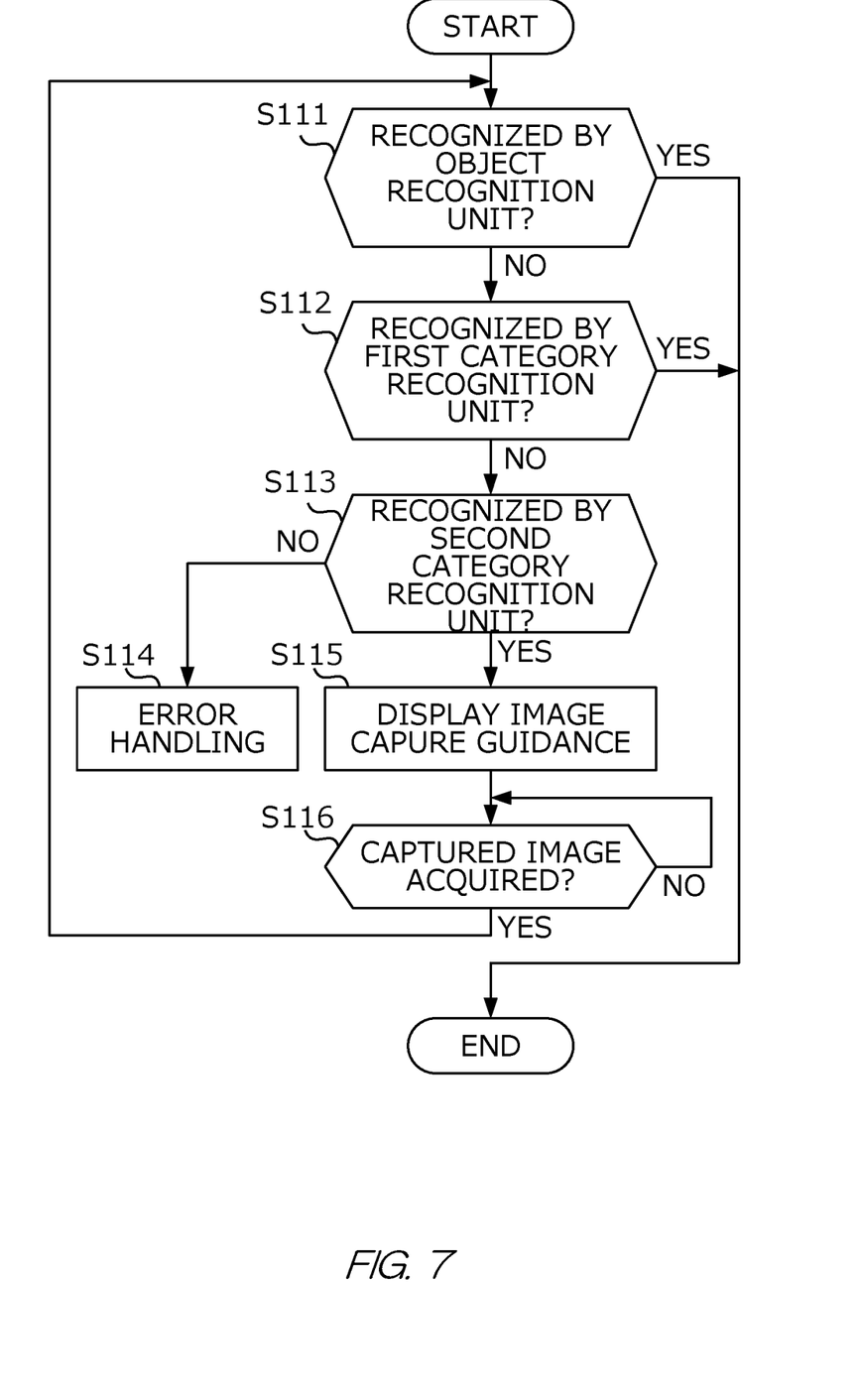
FIG. 7 is a flowchart showing an example of an image recognition procedure of the information-processing device.

The image recognition process (step S13 of FIG. 6) of information-processing device 10 will now be described with reference to FIG. 7. As shown in FIG. 7, initially, object recognition unit 111 of image recognition unit 11 performs object recognition on the captured image data. When object recognition unit 111 successfully recognizes an object (step S111; YES), first composite image determination unit 12 retrieves first composite image data identified by first composite image ID corresponding to the recognized object, from the auxiliary storage device 104, as described above. Subsequently, image composition instruction unit 13 sends an image composition instruction to image capture display device 20, which instruction includes the retrieved first composite image data, data on coordinates of the object in the display area of image capture display device 20, and data on relative coordinates corresponding to the recognized object (steps S14 to S15 in FIG. 6).

On the other hand, when object recognition unit 111 fails to recognize an object (step S111; NO), first category recognition unit 1121 of image recognition unit 11 performs category recognition on the captured image data. When first category recognition unit 1121 successfully recognizes a category (step S112; YES), first composite image determination unit 12 retrieves first composite image data identified by first composite image ID corresponding to the recognized category, from the auxiliary storage device 104, as described above. Subsequently, image composition instruction unit 13 sends an image composition instruction to image capture display device 20, which instruction includes the retrieved first composite image data and data on absolute coordinates corresponding to the recognized category (steps S14 to S15 in FIG. 6).

When first category recognition unit 1121 fails to recognize a category (step S112; NO), second category recognition unit 1122 of image recognition unit 11 performs category recognition on the captured image data. When second category recognition unit 1122 successfully recognizes a category (step S113; YES), recognition control unit 113 of image recognition unit 11 informs the user of a method for capturing an image (step S115).

Figure 9:
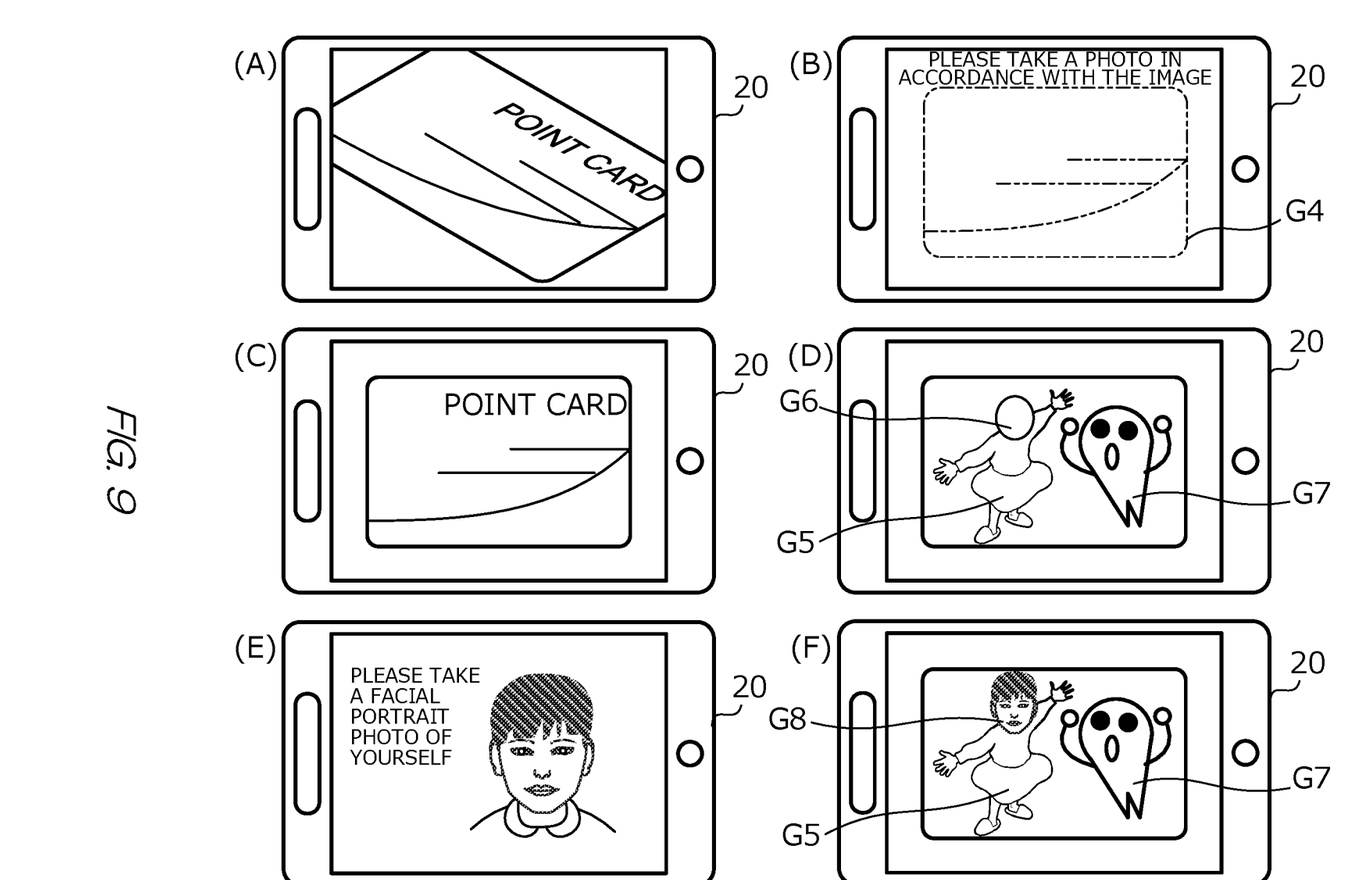
FIG. 9 is a diagram showing an example of display performed by the image capture display device.

In a case where an image of a point card for giving a privilege to a user from company A is captured by image capture display device 20, as shown in FIG. 9(A), the point card may not be recognized because of its position, attitude, or shape in the captured image. In such a case, a category of the point card may be recognized by second category recognition unit 1122, if the point card belongs to the second category group that can be recognized by second category recognition unit 1122. If a category of the point card is recognized, recognition control unit 113 of image recognition unit 11 sends image data representing a point card to image capture display device 20 to cause the device to superimpose an image in accordance with the image data on the captured image. The image data sent to image capture display device 20 represents a semi-transparent image representing a point card, which image aims at urging the user to adjust a position, an attitude, and a shape of the displayed point card so that it can be recognized. Based on the image data, semi-transparent image G4 representing a point card is displayed over the captured image on image capture display device 20, as shown in FIG. 9(B). In addition, a message is displayed stating "please take a photo in accordance with the image." Responsive to the guidance, the user adjusts a position and an attitude of image capture display device 20 so that the displayed point card overlaps semi-transparent image G4, and thereafter causes an image of the point card to be captured. Data on the captured image is sent from image capture display device 20 to information-processing device 10.

Object recognition unit 111 of image recognition unit 11, upon acquiring the captured image data (step S116 in FIG. 7; YES), performs object recognition on the captured image data. Since a position, an attitude, and a shape of the point card are adjusted so that the point card can be recognized, the point card is likely to be recognized. If the point card is recognized (step S111; YES), first composite image determination unit 12 retrieves first composite image data identified by first composite image ID corresponding to the recognized category, from the auxiliary storage device 104. Subsequently, image composition instruction unit 13 sends an image composition instruction to image capture display device 20, which instruction includes the retrieved first composite image data, data on coordinates of the object in the display area of image capture display device 20, and data on relative coordinates corresponding to the recognized object (steps S14 to S15 in FIG. 6).

As a result, a character animation (first composite image ID "C022" in FIG. 4) of a man dancing is superimposed as first composite image G5 determined according to a point card, and an animation (first composite image ID "C023" in FIG. 4) of a character dancing with the man is superimposed as first composite image G7, as shown in FIG. 9(D). First composite image G5 includes blank area G6 that is arranged at a position corresponding to the head of the man. Subsequently, when the user takes his/her facial image by use of image capture display device 20, as shown in FIG. 9(E), the facial image is superimposed on area G6 of first composite image G5 as second composite image G8, as shown in FIG. 9(F). As a result, an animation of a man dancing having the user's face and a dancing character are superimposed on the point card displayed on image capture display device 20. The user can thus enjoy viewing the composite image having personalized features unique to the user.

It is of note that at step S113 in FIG. 7, when second category recognition unit 1122 of image recognition unit 11 fails to recognize a category (step S113 in FIG. 7; NO), recognition control unit 113 of image recognition unit 11 performs a predetermined error handling such as notifying that image recognition failed, to image capture display device 20 (step S114).

The embodiment described in the foregoing provides the following effects.

An object shown in a captured image may not be correctly recognized by the object recognition function when a position, attitude, or shape of the object is not appropriate. In such a case, by providing a user with guidance to enable him/her to adjust a position, attitude, or shape of the displayed object, the object can be recognized. The guidance provided to the user includes a semi-transparent image representing the object and a message "please take a photo in accordance with the image;" which makes the guidance easy to understand for the user. Also, categories of objects are divided into the first category group covered by the first category recognition function and the second category group covered by the second category recognition function; accordingly, accuracy of category recognition for the objects is not reduced.

Also, a captured image displayed on image capture display device 20 is combined with, for example, a character animation (first composite image) of a man running having a user's face (second composite image). The user can enjoy viewing the composite image having personalized features unique to the user. The first composite image depends on a result of image recognition performed on the captured image; accordingly, the user is motivated to take a photo to see what type of first composite image is superimposed, and can enjoy viewing a superimposed first composite image. Also, since the second composite image is an image showing the user's face, the user can experience a feeling of being in a virtual space, shown in the captured image. Also, the user takes his/her face photo after seeing the first composite image that is superimposed on the captured image; accordingly, the viewer can adjust a direction or expression of his/her face (for example, turning his/her head away, or making a comical or anguished expression) to accord with the captured image and the first composite image. The user can derive satisfaction as a result of such an adjustment.

Modifications

The above embodiment may be modified as described below. The modifications described below may be combined with each other.

Modification 1

The first category group covered by the first category recognition function and the second category group covered by the second category recognition function may be integrated. In other words, first category recognition unit 1121 and second category recognition unit 1122 may be integrated as a single function. In that case, the present invention may be implemented as an information-processing device including an object recognition unit configured to recognize a position of an object shown in a captured image, a category recognition unit configured to recognize a category to which an object shown in the captured image belongs, and a recognition control unit configured, when recognition by the object recognition unit fails and recognition by the category recognition unit succeeds, to inform a user of a method for capturing an image, and to cause the object recognition unit to recognize another object shown in another captured image that is captured in accordance with the method. By integrating the first category group and the second category group, costs for designing two different category groups are not incurred.

Modification 2

In this embodiment, recognition control unit 113 instructs image capture display device 20 to superimpose a semi-transparent image representing an object on a captured image; however, a method for informing a user of a method for capturing an image is not limited to this method. In essence, recognition control unit 113 may instruct image capture display device 20 to display in a captured image, an image for specifying a position of an object in the captured image, to inform a user of a method for capturing an image.

Modification 3

Image composition unit 30, instead of superimposing a first composite image whose appearance depends on a result of image recognition performed by image recognition unit 11, may superimpose a first composite image, of which at least one of size, position, movement, or number depends on a result of image recognition performed by image recognition unit 11. A first composite image need not be a moving image, and may be a still image.

Image combination unit 30 may superimpose a first composite image that depends on not only a result of image recognition performed by image recognition unit 11, but also a user's attribute or a position or an attitude of image capture display device 20.

Image combination unit 30 superimposes a first composite image that depends on a result of image recognition performed by image recognition unit 11. For example, when an image of a building is captured, image combination unit 30 may recognize a ground surface on which the building stands, to superimpose a first composite image on the recognized ground surface. In another example, when a part of an object (for example, a roof, a door, or a clock of a clock tower) is recognized by image recognition unit 11, image composition unit 30 may superimpose a first composite image at a predetermined position relative to the recognized part. Specifically, image composition unit 30 may superimpose an augmented reality (AR) video showing a character of a first composite image that flies and lands on a roof of a clock tower, an AR video showing a character of a first composite image that opens a door of a clock tower, or an AR video showing a character of a first composite that rewinds a hand of a clock tower.

By changing various aspects of a first composite image depending on a result of image recognition as described, a user can derive greater enjoyment upon viewing a composite image.

Modification 4

In this embodiment, image composition unit 30 always uses a facial image taken by a user as a second composite image regardless of a result of image recognition performed by image recognition unit 11; however, image composition unit 30 may superimpose a different second composite image depending on a result of image recognition performed by image recognition unit 11. In that case, a user takes in advance images of his/her face with different expressions or from different directions so that data on the face is stored in auxiliary storage device 204 of image capture display device 20. Each of the facial images is assigned a tag indicating an emotion of the user (for example, enjoyment, sadness, laughter, crying, pretense of ignorance, or lack of emotion) as associated with an expression or attitude of the face. The tag may be assigned by the user, or may be assigned by image capture display device 20 or information-processing device 10 by use of an image recognition technique. Image composition unit 30 uses a facial image to which a tag corresponding to a result of image recognition performed by image recognition unit 11 is assigned, as a second composite image. Specifically, image composition unit 30 refers to auxiliary storage device 204 in which a result of image recognition performed by image recognition unit 11 is associated with a type of feeling, whereby a tag is identified that corresponds to a result of image recognition performed by image recognition unit 11, for retrieval of facial image data to which the identified tag is assigned, from auxiliary storage device 204.

Alternatively, image composition unit 30 may superimpose a second composite image, of which at least one of appearance, size, position, movement, or number, instead of a facial expression, depends on a result of image recognition performed by image recognition unit 11.

It is of note that a second composite image is not limited to a captured image, and may be any image such as an avatar or an animation.

By changing various aspects of a second composite image depending on a result of image recognition as described, a user can derive more enjoyment in viewing a composite image.

Modification 5

Image composition unit 30 may superimpose a different second composite image depending on a first composite image. For example, when an image of a landscape is captured by image capture display device 20, first composite image G1 determined according to the landscape is superimposed. Image composition unit 30 may provide a user with second composite images determined according to first composite image G1, and superimpose one of the second composite images that has been selected by the user.

As an example of selectively combining second composite images with a first composite image, a first composite image that is an animation of a man climbing a building shown in a captured image may be combined with second composite images showing different facial expressions. Specifically, the first composite image arranged at a lower level of the building may be combined with a second composite image showing a happy face, and the first composite image arranged at a higher level of the building may be combined with a second composite image showing an anguished face. In short, a second composite image may be changed in accordance with a movement or positional change of a first composite image.

By changing various aspects of a second composite image depending on a first composite image as described above, a user can derive greater enjoyment in viewing a composite image.

Modification 6

First composite image data may be stored in image capture display device 20, instead of in information-processing device 10, and information-processing device 10 may inform image capture display device 20 of first composite image data to be used, by use of a first composite image ID. As a result of this modification, an amount of data exchanged between information-processing device 10 and image capture display device 20 can be reduced.

Modification 7

A first composite image and a second composite image may be combined with, instead of an image that is captured by image capture unit 21 in real time, an image that has been captured by image capture unit 21 and stored in auxiliary storage device 204 for selective retrieval from the device; or may be combined with an image that is acquired from another device by use of image capture display device 20. In this way, greater flexibility is provided to a user in selecting an image for combination with a first composite image and a second composite image.

Modification 8

A first composite image or a second composite image may be used as an advertisement. For example, as a first composite image, an image may be used in which a character holds an advertised plastic bottled drink of a manufacturer, or an image may be used in which the character wears clothes in which the advertised plastic bottled drink is drawn at the center. When a user holds image capture display device 20 over an advertised plastic bottled drink of a beverage manufacturer, image capture display device 20 may display a character image of the beverage manufacturer over the plastic bottled drink as a first composite image, and further display the user's face over the character image as a second composite image.

When a user holds image capture display device 20 over a large intersection in a town, image capture display device 20 may display a first composite image over a screen panel set in the intersection, and further display an advertisement video over the first composite image as a second composite image, so that the user feels as if the advertisement is displayed in the town.

The combination of a first composite image and a second composite image may depend on a user's attribute, a location of image capture display device 20, or an advertisement fee paid by an advertiser.

The foregoing description refers to one way the present invention may be used for advertisements.

Other Modifications

The block diagrams used to describe the above embodiments show blocks of functional units. The blocks of functional units may be provided using any combination of items of hardware and/or software. Means for providing the blocks of functional units are not limited. The blocks of functional units may be provided using a single device including physically and/or logically combined components, or two or more physically and/or logically separated devices that are directly and/or indirectly connected by wire and/or wirelessly.

Embodiments described in the present specification may be applied to a system using LTE, LTE-Advanced (LTE-A), SUPER 3G, IMT-Advanced, 4G, 5G, Future Radio Access (FRA), W-CDMA (registered trademark), GSM (registered trademark), CDMA2000, Ultra Mobile Broadband (UMB), IEEE 802.11 (Wi-Fi), IEEE 802.16 (WiMAX), IEEE 802.20, Ultra-Wide Band (UWB), Bluetooth (registered trademark), or another appropriate system, or to a next-generation system that is expanded based on those systems.

The order of the processes in the embodiments described in the present specification may be changed as long as consistency is maintained. Methods described in the present specification include steps arranged in an exemplary order, but the steps may be arranged in another order.

Embodiments and modifications described in the present specification may be used separately or in combination, with minor changes. A notification of information (for example, a notification of "being X") may be made explicitly or implicitly.

The terms "system" and "network" used in the present specification are used interchangeably.

The term "determining" used in the present specification may refer to various actions. For example, the term "determining" may refer to judging, calculating, computing, processing, deriving, investigating, looking up (for example, looking up information in a table, a database, or a data structure), and ascertaining. The term "determining" may also refer to receiving (for example, receiving information), transmitting (for example, transmitting information), inputting, outputting, and accessing (for example, accessing data in memory). The term "determining" may also refer to resolving, selecting, choosing, establishing, and comparing.

The term "based on" used in the present specification does not mean "based only on," unless explicitly stated otherwise. In other words, the term "based on" means both "based only on" and "based at least on." The phrase "according to" used in the present specification does not mean "according only to," unless explicitly stated otherwise. In other words, the phrase "according to" means both "according only to" and "according at least to."

The term "including" and variations thereof used in the present specification or the claims are intended to be inclusive, as in the case of the term "comprising." The term "or" used in the present specification or the claims is not intended to be an exclusive disjunction.

In the present specification, terms to which an article such as "a," "an," or "the" is attached as a result of translation may be interpreted as being plural unless interpreted otherwise from the context.

Software should be interpreted broadly to include instructions, instruction sets, codes, code segments, program codes, a program, a subprogram, software modules, an application, a software application, a software package, a routine, a subroutine, an object, an executable file, an execution thread, a procedure, and a function, regardless of whether it is called software, firmware, middleware, microcode, hardware description language, or any other term relevant within the context. Software and instructions may be sent and received via a transmission medium. For example, software may be sent from a website, a server, or another remote source, using a wired medium such as a coaxial cable, a fiber optic cable, a twisted pair, or a digital subscriber line (DSL), and/or a wireless medium such as infrared, wireless, or microwave. The wired medium and the wireless medium are included within the definition of a transmission medium.

The terms "connected" and "coupled," and variants thereof mean any direct or indirect connection or coupling between two or more elements. Two or more elements may be "connected" or "coupled" via one or more intermediate elements. Coupling or connection between elements may be physical, logical or a combination thereof. In the present specification, two elements are "connected" or "coupled" by use of one or more electrical wires, one or more cables, and/or one or more printed electrical connections, or by use of, as a non-limiting and non-exclusive example, electromagnetic energy having a wavelength in a radio frequency range, a microwave range, or a visible or invisible light range.

An information-processing device according to the present invention may include a single device having all necessary functions, as in the case of the embodiment, and a functionally distributed system including plural devices.

The present invention may be implemented in an information-processing method performed by information-processing device 10, or in a program for causing a computer to function as information-processing device 10. The program may be distributed in the form of a recording medium such as an optical disc, or may be downloaded and installed to a computer via a network such as the Internet. The term program should be interpreted broadly to include instructions, instruction sets, codes, code segments, program codes, a program, a subprogram, software modules, an application, a software application, a software package, a routine, a subroutine, an object, an executable file, an execution thread, a procedure, and a function, regardless of whether it is called software, firmware, middleware, microcode, hardware description language, or any other term relevant within the context.

DESCRIPTION OF REFERENCE NUMERALS 1 information-processing system
10 information-processing device
11 image recognition unit
12 first composite image determination unit
13 image composition instruction unit
20 image capture display device
21 image capture unit
22 second composite image acquisition unit
23 image data generation unit
24 display unit
90 network
101 CPU
102 RAM
103 ROM
104 auxiliary storage device
105 communication IF
201 CPU
202 RAM
203 ROM
204 auxiliary storage device
205 communication IF
206 camera
207 UI device

What is claimed is:

1. An information-processing device comprising:
a processor configured to:
  recognize a position of an object shown in a captured first image;
  recognize a category from a first category group to which the object shown in the captured first image belongs;
  recognize a category from a second category group to which the object shown in the captured first image belongs, the first category group being different from the second category group; and
  when the position of the object and the category of the first category group of the object are not recognized and the category of the second category group of the object is recognized, inform a user of a method for capturing a second image showing the object to cause successful recognition of at least one of the position of the object and the category of the first category group shown in the captured second image by instructing an image capture display device configured to capture the second image in accordance with the user's operation to display the second image and a semi-transparent image superimposed on the displayed second image, the semi-transparent image representing the object and indicating a recommended position of the object in the second image to be captured.

2. The information-processing device according to claim 1, wherein the processor is further configured to:

when the position of the object in at least one of the captured first image and the captured second image is recognized, instruct the image capture display device to combine a first composite image determined according to the recognized object of the first category group on the at least one of the captured first image and the captured second image based on the recognized position of the object in the at least one of the captured first image and the captured second image.

3. The information-processing device according to claim 2, wherein the processor is further configured to:

when the category of the first category group in at least one of the captured first image and the captured second image is recognized, instruct the image capture display device to superimpose a second composite image determined according to the recognized category of the first category group on the at least one of the captured first image and the captured second image.

4. The information-processing method according to claim 3, wherein the second composite image is an image of a person's face.

5. An information-processing method comprising:

recognizing a position of an object shown in a captured first image;

recognizing a category from a first category group to which the object shown in the captured first image belongs;

recognizing a category from a second category group to which the object shown in the captured first image belongs, the first category group being different from the second category group; and when the position of the object and the category of the first category group of the object are not recognized and the category of the second category group of the object is recognized, informing a user of a method for capturing a second image showing the object to cause successful recognition of at least one of the position of the object and the category of the first category group shown in the captured second image by instructing an image capture display device configured to capture the second image in accordance with the user's operation to display the second image and a semi-transparent image superimposed on the displayed second image, the semi-transparent image representing the object and indicating a recommended position of the object in the second image to be captured.

6. The information-processing method according to claim 5 further comprising:

when the position of the object in at least one of the captured first image and the captured second image is recognized, instructing the image capture display device to combine a first composite image determined according to the recognized object of the first category group on the at least one of the captured first image and the captured second image based on the recognized position of the object in the at least one of the captured first image and the captured second image.

7. The information-processing method according to claim 6 further comprising:

when the category of the first category group in at least one of the captured first image and the captured second image is recognized, instructing the image capture display device to superimpose a second composite image determined according to the recognized category of the first category group on the at least one of the captured first image and the captured second image.

8. The information-processing method according to claim 7, wherein the second composite image is an image of a person's face.

* * * * *